(No Model.)
H. D. COOL.
VEHICLE BRAKE.
No. 532,641. Patented Jan. 15, 1895.
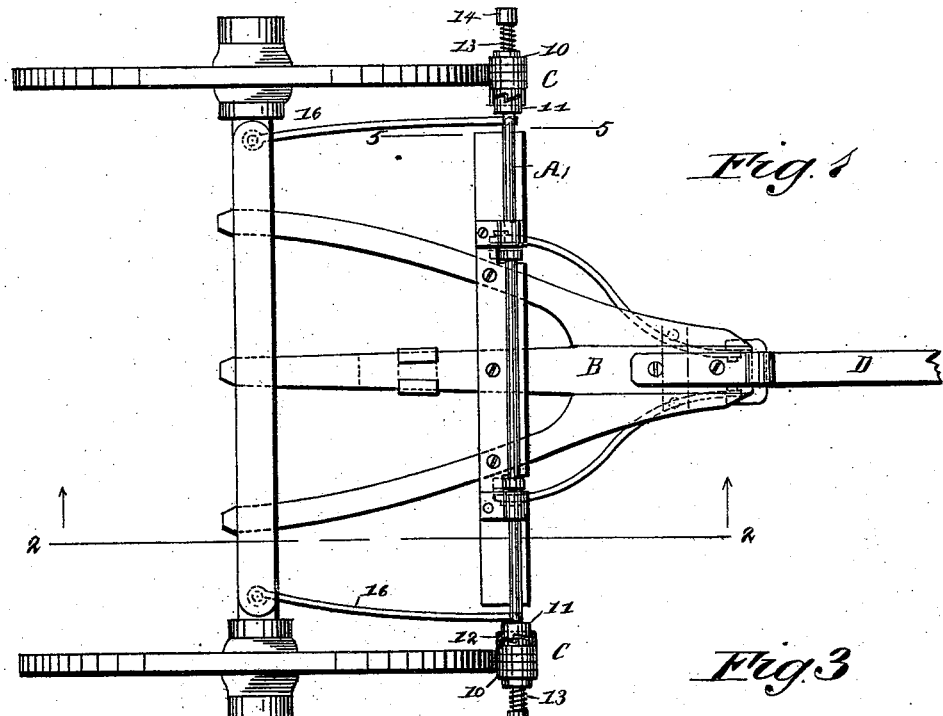
Fig. 1
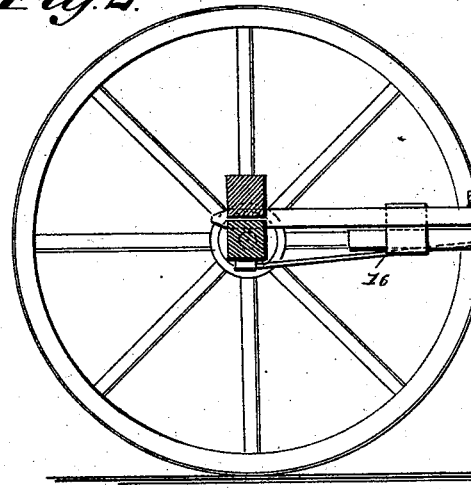
Fig. 2
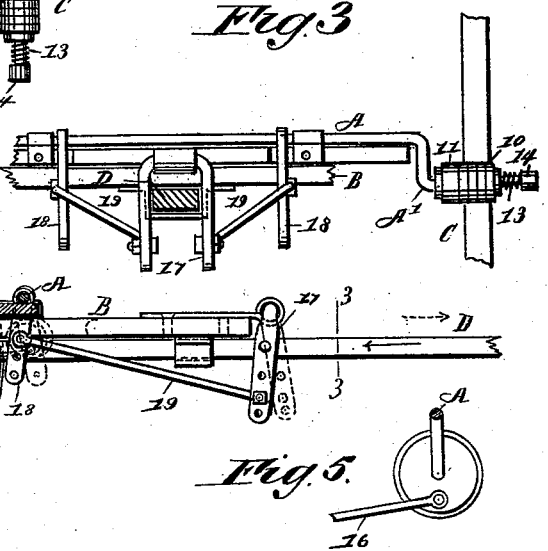
Fig. 3
Fig. 5
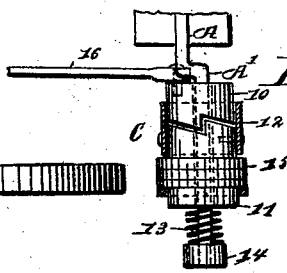
Fig. 4
WITNESSES:
INVENTOR
H. D. Cool
BY
Munn & Co
ATTORNEYS.

UNITED STATES PATENT OFFICE.

HORACE D. COOL, OF LITTLE VALLEY, ASSIGNOR TO HIMSELF, AND CHARLES G. LOCKE, OF RANDOLPH, NEW YORK.

VEHICLE-BRAKE.

SPECIFICATION forming part of Letters Patent No. 532,641, dated January 15, 1895.

Application filed August 9, 1894. Serial No. 519,859. (No model.)

*To all whom it may concern:*

Be it known that I, HORACE D. COOL, of Little Valley, in the county of Cattaraugus and State of New York, have invented a new and Improved Vehicle-Brake, of which the following is a full, clear, and exact description.

My invention relates to an improvement in vehicle brakes, and it has for its object to provide a cylindrical brake which will be so divided that each part will perform certain and separate functions, and whereby the parts of the brake acting in conjunction will produce the desired friction direct on the wheel.

A further object of the invention is to provide an automatic vehicle brake, or one which will be applied by the team in holding back, and to so construct the brake that when in braking position the shoes will act to effectually prevent a forward movement of the wheels with which they contact, but wherein without removing the shoes from engagement with the wheels, the wheels may be moved in a rearward direction to back the vehicle as freely as if the brake were not applied.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views shown.

Figure 1 is a plan view of the rear portion of a vehicle and the improved brake applied thereto. Fig. 2 is a section taken substantially on the line 2—2 of Fig. 1. Fig. 3 is a section taken substantially on the line 3—3 of Fig. 2. Fig. 4 is a detail view of a brake shoe; and Fig. 5 is a detail section taken substantially on the line 5—5 of Fig. 1.

In carrying out the invention a rock shaft A, is mounted upon the rear hounds B, or upon a support carried by the said hounds, the shaft extending transversely of the hounds, and terminating at each end in a crank arm A', one arm being in front of each rear wheel. Each crank arm carries a cylindrical brake shoe C, and each shoe comprises two sections 10 and 11, one section, the outer section 11 for example, only being adapted for engagement with the wheel. The opposing faces of the two sections are clutch faces, and the teeth composing said faces are so formed that when one of the sections is held stationary and the other section revolved in the direction of the wheel, which would be the case if the vehicle were advancing and the wheel in contact with the section, the revoluble section will cease to revolve and will act in the same manner as if in one piece; but, on the other hand, when the vehicle is backed, the shoe still being in engagement with the wheel, the revoluble section will be rotated in a forwardly direction, thus in a measure aiding the wheel with which it contacts to revolve in the required direction.

Both of the sections 10 and 11 are loosely mounted upon the crank arm adapted to support them, and the space between the sections is guarded from dirt, or other deleterious matter by a shield 12, attached to one section and covering the said space, as is likewise shown in Fig. 4. The outer section 11, is constantly held in clutch engagement with the inner section 10 through the medium of a spring 13, having bearing against the outer end of the outer section, the spring being confined upon the crank arm by a cap 14, or an equivalent stop. The outer section 11 of the improved brake shoe, is preferably provided with a peripheral braking surface 15 of sole leather, or equivalent material, placed thereon in annular strips, or otherwise applied.

The movement of the brake shoes to and from the wheel is controlled by rods 16, pivotally connected with the inner faces of the inner sections 10 of the shoes, either eccentrically or concentrically, and the opposite ends of the rods are attached to an axle. Thus it will be observed that the shoes are controlled from the axle of the vehicle.

The brake is applied through the medium of the reach D of the vehicle, which is constructed so that it will have more or less end movement, and its application is ofttimes made, as shown in the drawings, through the medium of a clevis 17, attached to the forward end of the rear hounds, the members of the clevis extending downward at opposite sides of the reach, being pivotally connected therewith; and the members of the clevis are attached to crank arms 18, projected downward from the rock shaft A, one from each side of its center, the connection being effected through the medium of links 19, and the said links are adjustably attached to the clevis and the intermediate crank arms 18 of the rock shaft, in order that the power with which the brake is to be applied may be rendered greater or less as the character of the vehicle may demand, or as may be demanded by the nature of the road or load.

The springs 13 serve to prevent the cylindrical brake shoes from lateral movement, and insure likewise a co-operation at all times between the sections of the shoes.

In the operation of this brake, if the vehicle is traveling on descending ground, the action of holding back on the part of the team will cause the shoes to be applied to the rear wheels, and as the inner sections of the shoes are held stationary when applied, by the connecting bars 16 projected from the axle, and since the outer sections of the shoes cannot revolve in a rearwardly direction when the inner sections are stationary, the shoes will act upon the wheels to prevent them revolving forwardly, and in as perfect and reliable a manner as though the shoes were in one piece, but if, during the descent, it should be desirable to back the vehicle, or to turn the same, either wheel will have an uninterrupted rearward movement without removing the brakes from the wheels, since the outer sections of the brake shoes contacting with the wheels are capable of uninterrupted forward rotary movement. Therefore, in a brake of the above description, a vehicle can be stopped, backed or turned upon a hill-side without danger of moving down the incline, which would not be the case if the brake had to be removed from the wheels in backing or in turning.

It will be understood further, that this brake may be applied from the pole of the vehicle, or it may be applied by means of a hand or of a foot lever.

Having thus described my invention, I claim as new and desire to secure by Letters Patent—

1. The combination with a shaft adapted to be mounted parallel with the rear axle, of cylindrical brake shoes turning loosely on the ends of the shaft to engage the rear wheels and having clutch teeth on their inner ends, springs on the outer extremities of the shaft and pressing the shoes inwardly, and clutch sections on the shaft and engaged by said clutch teeth, substantially as set forth.

2. In a brake, a crank shaft provided on its crank with a loose cylindrical brake shoe, divided into two sections having interlocking clutch teeth, a spring holding the two sections together, means for rocking the crank shaft and means for holding the inner one of the brake sections stationary, substantially as described.

3. A brake comprising a crank shaft, a cylindrical brake shoe on the crank and formed of two sections connected by interlocking clutch teeth, a spring pressing the two sections together, means for rocking the crank shaft from the reach of a vehicle and means for connecting the inner brake section with the axle, substantially as described.

4. In a brake shoe for vehicles, a rock shaft provided with crank arms extending in front of the wheels of the vehicle, a cylindrical brake mounted upon each crank arm, composed of two sections having clutch connection, and tension devices holding said sections in engagement, a rod attached to one of the sections and to a fixed portion of the vehicle, limiting the movement of the section with which it is connected, and means for operating the crank shaft, substantially as described.

5. In a brake shoe for vehicles, a rock shaft provided with crank arms extending in front of the wheels of the vehicle, a cylindrical brake mounted upon each crank arm, composed of two sections having clutch connection, and tension devices holding said sections in engagement, a rod attached to one of the sections and to a fixed portion of the vehicle, limiting the movement of the section with which it is connected, a sliding reach, and adjustable shifting devices connecting the reach with the rock shaft, as and for the purpose specified.

HORACE D. COOL.

Witnesses:
CHARLES G. LOCKE,
F. M. MERRILL.